United States Patent
Seo et al.

(10) Patent No.: US 10,142,194 B2
(45) Date of Patent: Nov. 27, 2018

(54) METHOD AND APPARATUS FOR INTEROPERABLY PERFORMING SERVICES AND SYSTEM SUPPORTING THE SAME

(71) Applicant: Samsung Electronics Co., Ltd., Gyeonggi-do (KR)

(72) Inventors: Joonkyu Seo, Gyeonggi-do (KR); Kyunga Kang, Seoul (KR); Jiyeon Kwak, Seoul (KR); Hyunjin Kim, Seoul (KR); Juyoun Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 268 days.

(21) Appl. No.: 13/748,229

(22) Filed: Jan. 23, 2013

(65) Prior Publication Data
US 2013/0204967 A1    Aug. 8, 2013

(30) Foreign Application Priority Data
Feb. 7, 2012   (KR) .................... 10-2012-0012085

(51) Int. Cl.
*H04L 12/26*    (2006.01)
*H04L 29/08*    (2006.01)
*H04W 4/18*    (2009.01)

(52) U.S. Cl.
CPC .......... *H04L 43/00* (2013.01); *H04L 67/2814* (2013.01); *H04L 67/303* (2013.01); *H04L 67/327* (2013.01); *H04W 4/18* (2013.01)

(58) Field of Classification Search
CPC ..... H04L 43/0876; H04L 43/50; H04L 43/00; H04L 45/72; H04L 43/0829; H04L 43/0852; H04L 67/303

USPC .................................................. 709/217, 224
See application file for complete search history.

(56) References Cited

U.S. PATENT DOCUMENTS

| | | | |
|---|---|---|---|
| 5,787,259 A * | 7/1998 | Haroun et al. ................ | 709/253 |
| 7,454,542 B2 | 11/2008 | Illowsky et al. | |
| 8,819,116 B1 * | 8/2014 | Tomay ................ | H04N 21/254 |
| | | | 709/203 |
| 2005/0157748 A1 * | 7/2005 | Park .............................. | 370/466 |
| 2006/0002320 A1 * | 1/2006 | Costa-Requena et al. ... | 370/312 |
| 2010/0169791 A1 | 7/2010 | Pering et al. | |

(Continued)

FOREIGN PATENT DOCUMENTS

| | | |
|---|---|---|
| EP | 1520271 | 7/2011 |
| JP | 2009123032 | 6/2009 |

(Continued)

OTHER PUBLICATIONS

European Search Report dated Oct. 6, 2015 issued in counterpart application No. 13747187.6.-1853, 6 pages.

*Primary Examiner* — Nicholas R Taylor
*Assistant Examiner* — Afroza Sultana
(74) *Attorney, Agent, or Firm* — The Farrell Law Firm, P.C.

(57) ABSTRACT

A method and apparatus are provided for interoperably performing a service. The method includes searching, by the portable terminal, external devices; identifying a service interoperation device corresponding to a characteristic of the service among the searched external devices; recommending the service interoperation device; and performing the service in interoperation with the recommended service interoperation device.

18 Claims, 12 Drawing Sheets

(56) References Cited

U.S. PATENT DOCUMENTS

| | | | |
|---|---|---|---|
| 2011/0093567 A1* | 4/2011 | Jeon et al. | 709/219 |
| 2011/0131520 A1* | 6/2011 | Al-Shaykh et al. | 715/772 |
| 2012/0036494 A1* | 2/2012 | Gurumohan et al. | 717/106 |
| 2012/0146918 A1* | 6/2012 | Kreiner | H04M 1/7253 345/173 |
| 2013/0066940 A1 | 3/2013 | Shao | |

FOREIGN PATENT DOCUMENTS

| | | |
|---|---|---|
| JP | 2010211802 | 9/2010 |
| WO | WO 2011/144029 | 11/2011 |

\* cited by examiner

METHOD AND APPARATUS FOR INTEROPERABLY PERFORMING SERVICES AND SYSTEM SUPPORTING THE SAME

PRIORITY

This application claims priority under 35 U.S.C. § 119(a) to Korean Patent Application Serial No. 10-2012-0012085, which was filed in the Korean Intellectual Property Office on Feb. 7, 2012, the entire disclosure of which is hereby incorporated by reference.

BACKGROUND OF THE INVENTION

1. Field of the Invention

The present invention relates generally to a method and apparatus for providing a service in interoperation with peripheral devices and a system supporting the same, and more particularly, to a method and apparatus for recommending external devices for a service and performing the service in interoperation with the recommended external devices, and a system supporting the same.

2. Description of the Related Art

In a portable terminal, an input device, a display, an audio processor and other devices are integrated with one another as one. Thus, the portability of the terminal, the size and weight of the portable terminal are restricted by these components. Accordingly, additional external devices are used to compensate for the inconvenience resulted from the insufficient hardware of the portable terminal when providing a service to the portable terminal.

For example, the portable terminal uses an external display device having a larger screen, an external speaker supporting higher sound quality and greater volume, an external touch panel having an lager input unit, a wired/wireless key board and/or mouse, as peripheral input devices, etc.

However, depending on the service provided, it is often inconvenient for a user to operate the service using these external devices. Further, some external devices are not suitable for outputting data generated while performing the service.

SUMMARY OF THE INVENTION

The present invention is designed to address at least the problems and/or disadvantages described above and to provide at least the advantages described below.

Accordingly, an aspect of the present invention is to provide a solution for inconveniences caused when performing a service in interoperation with a portable terminal by using external devices.

Another aspect of the present invention is to provide a portable terminal and a method for interoperating with external devices considering a characteristic of a service provided.

Another aspect of the present invention is to provide a method and apparatus for recommending external devices suitable to a characteristic of a service and performing the service in interoperation with the recommended device, and a system supporting the same.

In accordance with an aspect of the present invention, a method is provided for performing an interoperation service in a portable terminal. The method includes searching, by the portable terminal, external devices; identifying a service interoperation device corresponding to a characteristic of the service among the searched external devices; recommending the service interoperation device; and performing the service in interoperation with the recommended service interoperation device.

In accordance with another aspect of the present invention, a method is provided for performing an interoperation service in a portable terminal. The method includes starting the service; starting the service; searching external devices; recommending the searched external devices according to a characteristic of the service; selecting the service interoperation device from the recommended external devices; determining a function of the portable terminal according to the selected service interoperation device; and performing at least one of transmitting data of the service and receiving a command for processing the data of the service according to the determined function of the portable terminal.

In accordance with another aspect of the present invention, an apparatus is provided for performing a service with a service interoperation device. The apparatus includes a communication unit for searching external devices by transmitting a profile request to each of the external devices; and a controller for identifying a service interoperation device corresponding to a characteristic of the service among the searched external devices, recommending the service interoperation device, and performing the service in interoperation with the recommended service interoperation device.

In accordance with another aspect of the present invention, a system for performing an interoperation service is provided. The system includes a portable terminal; and external devices communicating with the portable terminal. the portable terminal recommends a service interoperation device corresponding to a service characteristic from the external devices, and performs the service in interoperation with the recommended service interoperation device.

BRIEF DESCRIPTION OF THE DRAWINGS

The above and other aspects, features, and advantages of certain embodiments of the present invention will be more apparent from the following detailed description when read in conjunction with the accompanying drawings, in which.

DETAILED DESCRIPTION OF EMBODIMENTS OF THE INVENTION

Various embodiments of the present invention are described in detail below with reference to the accompanying drawings. The same reference numbers are used throughout the drawings to refer to the same or like parts. Additionally, detailed descriptions of well-known functions and structures incorporated herein may be omitted to avoid obscuring the subject matter of the present invention.

The terms and words used in the following description and claims are not limited to their dictionary meanings, but are merely used by the inventor to enable a clear and consistent understanding of the invention. Accordingly, it should be apparent to those skilled in the art that the following description of the embodiments of the present invention is provided for illustration purpose and not to limit the invention, as will defined by the appended claims and their equivalents. Further, those of ordinary skill in the art will recognize that various changes and modifications of the embodiments described herein can be made without departing from the scope and spirit of the present invention.

Herein, the term "service" refers to an application or a specific routine that is provided to a user from a portable terminal. For example, the service includes movie playback, viewing a photograph, listening to music, game execution, Internet browsing, texting messages, editing images and preparing documents. Accordingly, a service may be provided to a user according to various applications installed in the portable terminal.

Herein, the term "external device" refers to a device that is separate from the portable terminal and capable of communicating with the portable terminal, either wirelessly or through a wired connection. For example, the external device may include another portable terminal, a tablet Personal Computer (PC), a television, a desktop PC, a computer monitor, a keyboard/mouse, a joystick, a speaker, a home theater system, etc.

Additionally, the portable terminal may include a mobile communication terminal, a Portable Multimedia Player (PMP), a digital broadcasting player, a Personal Digital Assistant (PDA), a music file player (e.g., an MP3 player), a portable game terminal, a tablet PC, a smart phone, etc.

Herein, the term "service interoperation device" refers to an external device that performs a service in interoperation with the portable terminal.

In accordance with an embodiment of the present invention, a user is provided with rich user experience by allowing the user to interoperate the portable terminal with an external device, based on a characteristic of a service being provided from the portable terminal.

Figure 1:
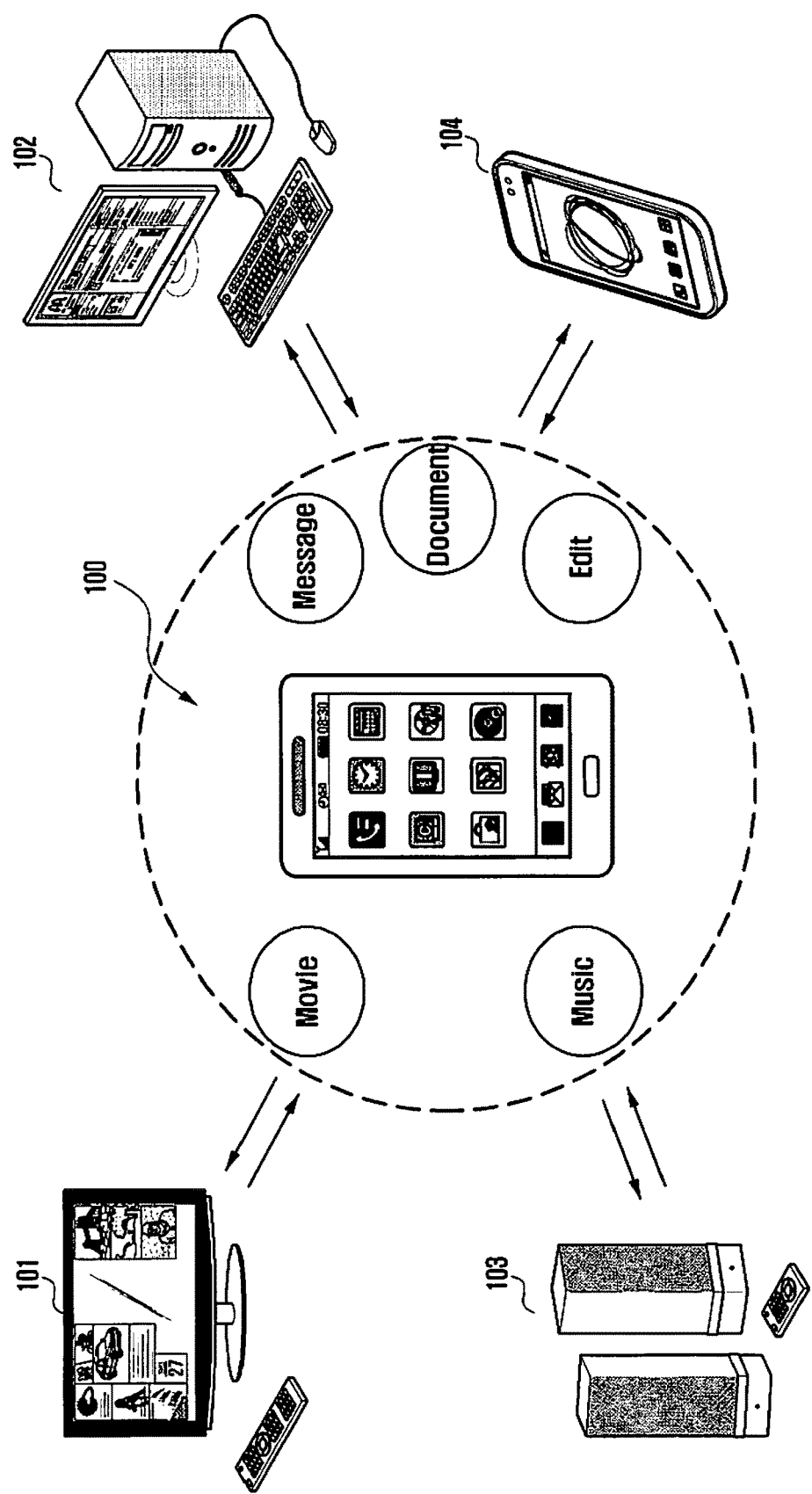
FIG. 1 illustrates a system for interoperably performing a service according to an embodiment of the present invention.

FIG. 1 illustrates a system for interoperably performing a service according to an embodiment of the present invention.

Referring to FIG. 1, the system includes a portable terminal 100 and peripheral external devices 101-104. The portable terminal 100 provides a service such as movie playback, viewing a photograph, listening to music, game execution, internet browsing, texting messages, preparing documents, editing images, etc. Further, the portable terminal 100 recommends one of the external devices 101-104 and then performs a service in interoperation with the recommended external device.

Particularly, the portable terminal 100 is characterized that it may interoperate with at least one of the external device 101-104. For example, when viewing a movie, if it is determined that a user enjoys a vivid visual effect when viewing the movie, the portable terminal recommends a television 101 with a screen having a relatively large size among the peripheral external devices 101-104. In this case, the portable terminal 100 may identify a preferred service characteristic from preset user preference information or a stored service history. Accordingly, the portable terminal 100 may perform a service, i.e., view a movie, in interoperation with the recommended television 101 having a large screen to provide a high quality and rich user experience.

Figure 2:
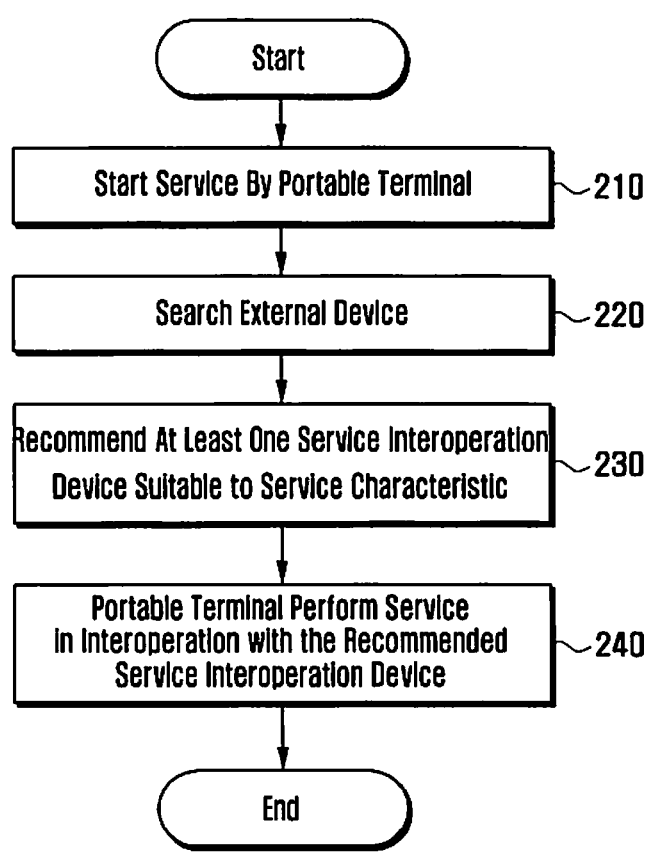
FIG. 2 is a flowchart illustrating a method for interoperably performing a service according to an embodiment of the present invention.

FIG. 2 is a flowchart illustrating a method for interoperably performing a service according to an embodiment of the present invention.

Referring to FIG. 2, a portable terminal starts a service in step 210. In step 220, the portable terminal searches external devices located around the portable terminal. In step 230, the portable terminal recommends at least one service interoperation device suitable to a service characteristic of the service being performed. In step 240, the portable terminal performs the service in interoperation with the recommended service interoperation device.

Figure 3A:
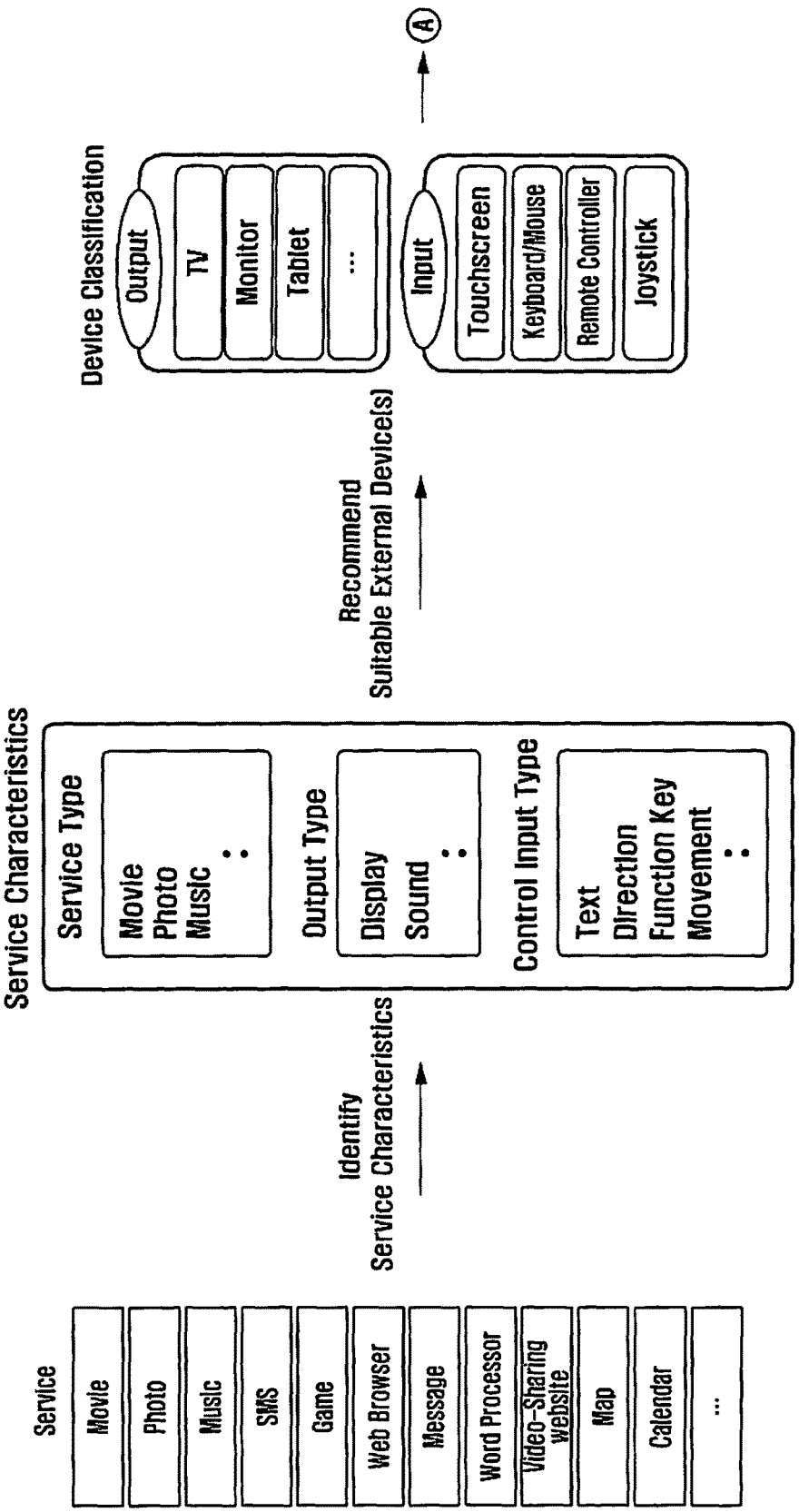
FIGS. 3A and 3B are conceptual diagrams illustrating a method for interoperably performing a service according to an embodiment of the present invention.
Figure 3B:
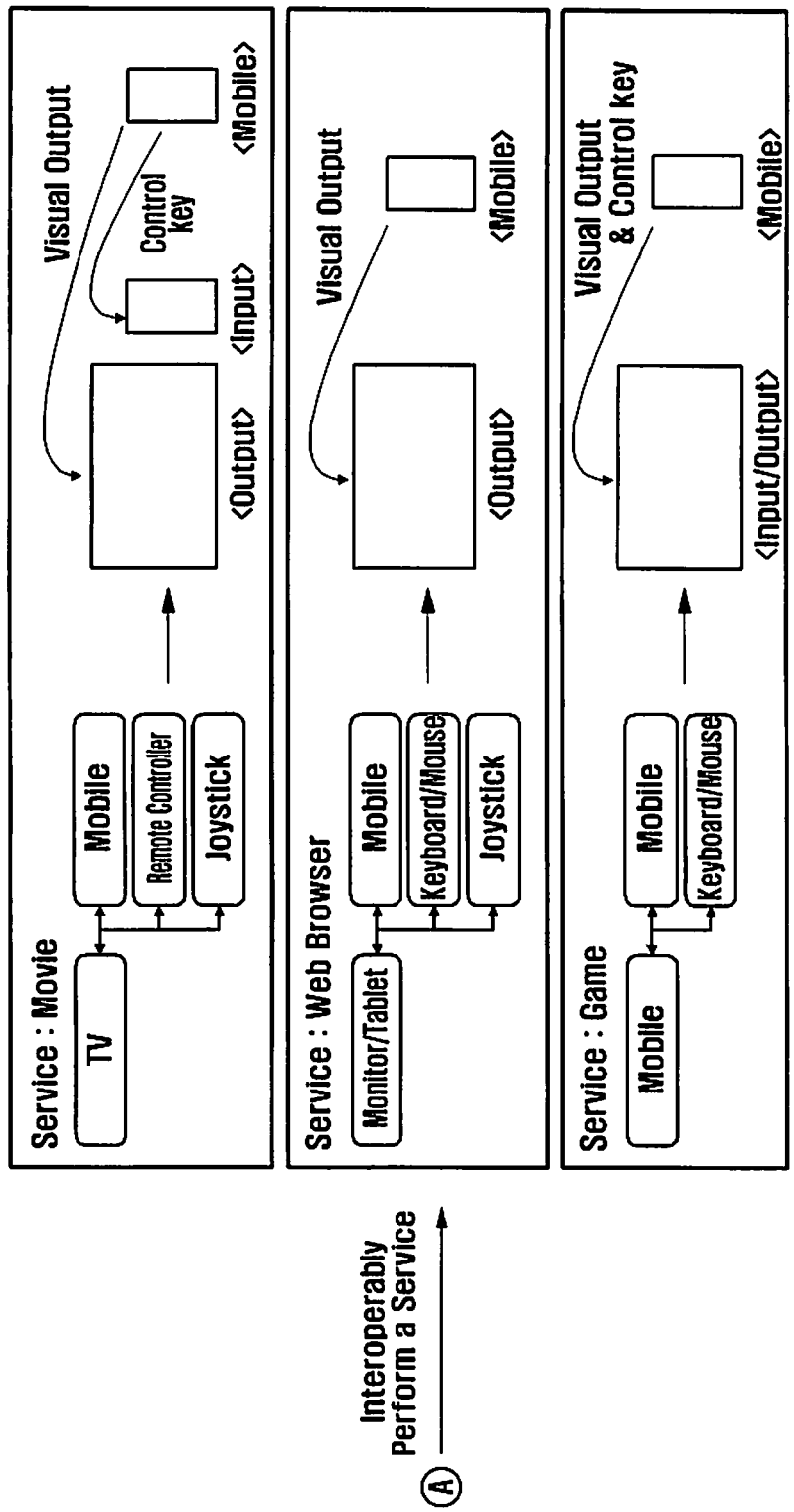

FIGS. 3A and 3B are conceptual diagrams illustrating a method for interoperably performing a service according to an embodiment of the present invention.

Referring to FIG. 3A, the service of the portable terminal has various types of services, i.e., Movie, Photo, Music, Short Message Service (SMS), Game, Web Browser, Message, Word Processor, Video-Sharing Website, Map search, Calendar, etc.

When a user selects and starts a desired service, a service characteristic of the selected service is identified in order to recommend at least one service interoperation device. For example, the service characteristic includes a type of the service, a service output scheme, and a control input scheme.

After indentifying the service characteristic, the portable terminal recommends a suitable service interoperation device from external devices, based on the service characteristic, as illustrated in FIG. 3B.

More specifically, at least one external device is recommended based on a device characteristic that corresponds to the service characteristic. For example, a certain external device may be recommended based on a type of service and the service input/control output scheme of the device. For example, the service output scheme includes display and sound, and the control input scheme includes Text, Direction, Function Key, and Movement.

For example, for a Web Browser service, the portable terminal may recommend a computer monitor or a tablet PC as a service output device, and then recommend a portable terminal, keyboard/mouse, and a joystick, as a control input device. For a Game service, the portable terminal may recommend itself as a service output device and recommend another portable terminal and keyboard/mouse as the control input device.

In accordance with an embodiment of the present invention, a service is provided in interoperation with a recommended service interoperation device. For example, when the service is a movie playback service, a television may be selected as the output device and at least one of the portable terminal itself, a remote controller, and a joystick, may be recommended as the control input device to provide the service in interoperation with the portable terminal.

Figure 4:
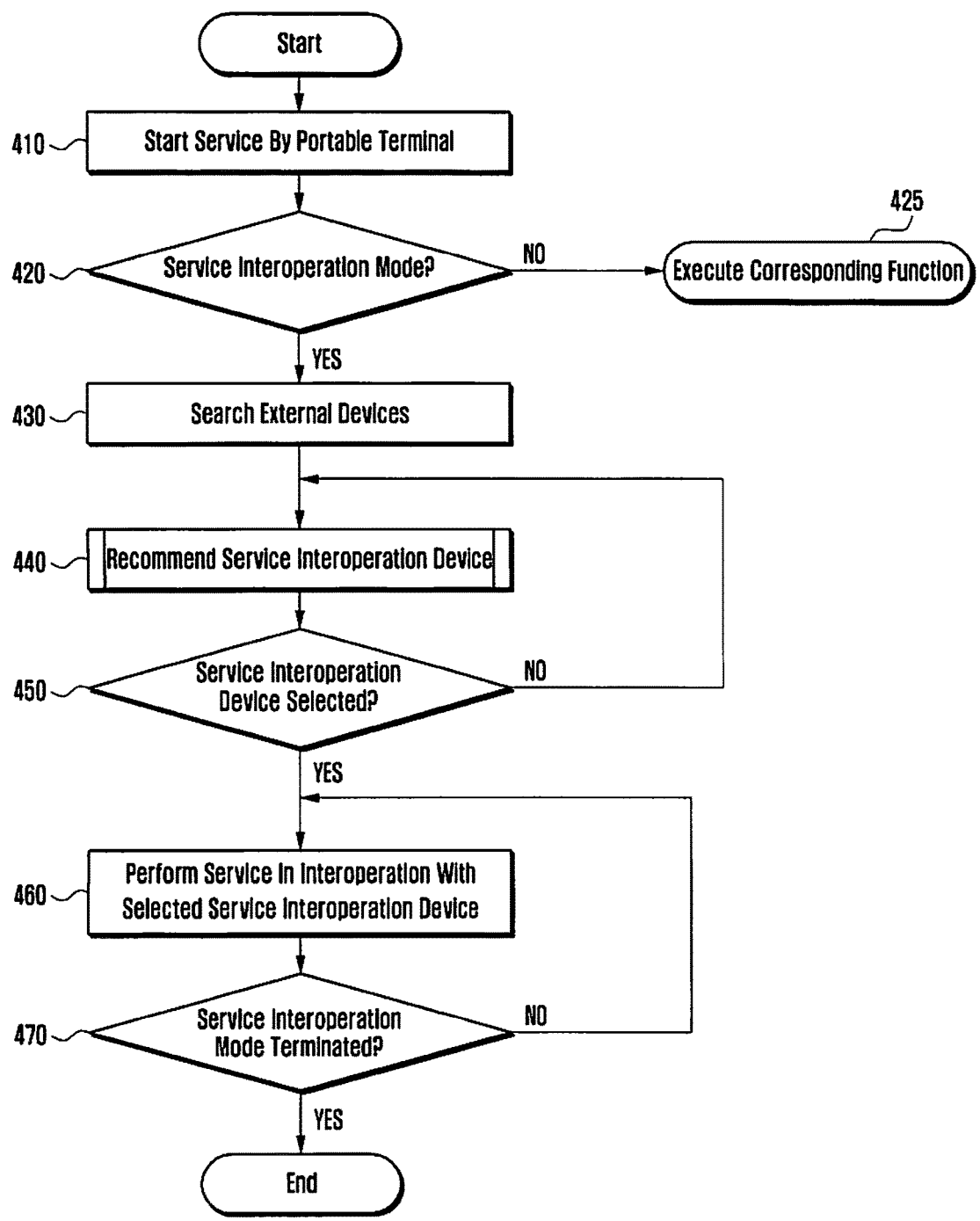
FIG. 4 is a flowchart illustrating a method for interoperably performing a service by a portable terminal according to an embodiment of the present invention.

FIG. 4 is a flowchart illustrating a method for interoperably performing a service by a portable terminal according to an embodiment of the present invention.

Referring to FIG. 4, a portable terminal starts a service in step 410. For example, the portable terminal executes a specific application or routine, based on a user input.

In step 420, the portable terminal determines whether a service interoperation mode is requested, e.g., through a function key input. The service interoperation mode controls the portable terminal to interoperate with a peripheral device to perform the service. For example, the service interoperation mode may be configured with a part of a specific application or be provided at the portable terminal itself.

When the service interoperation mode is not requested in step 420, the portable terminal executes a function according to the service in step 425.

However, when the service interoperation mode is requested in step 420, the portable terminal searches peripheral external devices in step 430. In step 440, the portable terminal recommends at least one service interoperation device from the searched external devices. As described above, the service interoperation device is a device suitable for performing a service in interoperation with the portable terminal.

In step 450, the portable terminal determines whether one of the at least one recommended service interoperation devices is selected by the user. When none of the recommended service interoperation devices are selected, the portable terminal returns to step 440 and continuously recommends service interoperation devices.

For example, the portable terminal displays a plurality of service interoperation devices and performs the service based on a user's selection from the recommended service interoperation devices. Alternatively, the portable terminal may select the service interoperation device depending on the number of recommended service interoperation devices.

For example, if there is only one recommended service interoperation device, the portable terminal may automatically select that service interoperation device and then perform the service in interoperation with the selected service interoperation device recommended. However, when several service interoperation devices are recommended, then the portable terminal requests the user to select the recommended service interoperation device in step 450.

When a recommended service interoperation device is selected in step 450, the portable terminal performs the service in interoperation with the selected service interoperation device in step 460.

In step 470, the portable terminal determines whether the service interoperation mode is terminated, while performing the service.

When a request for the termination is detected, the portable terminal continues the service interoperation procedure in step 460.

When a request for the termination is detected, the portable terminal terminates a service interoperation procedure. When terminating the service interoperation procedure, the portable terminal may release connection with the service interoperation device. Subsequently, the portable terminal may stop performing the service or continuously perform the service using function units of the portable terminal.

Alternatively, the portable terminal may terminate the service interoperation mode after the service ends, e.g., when a movie is over, or after a preset time limitation.

Figure 5A:
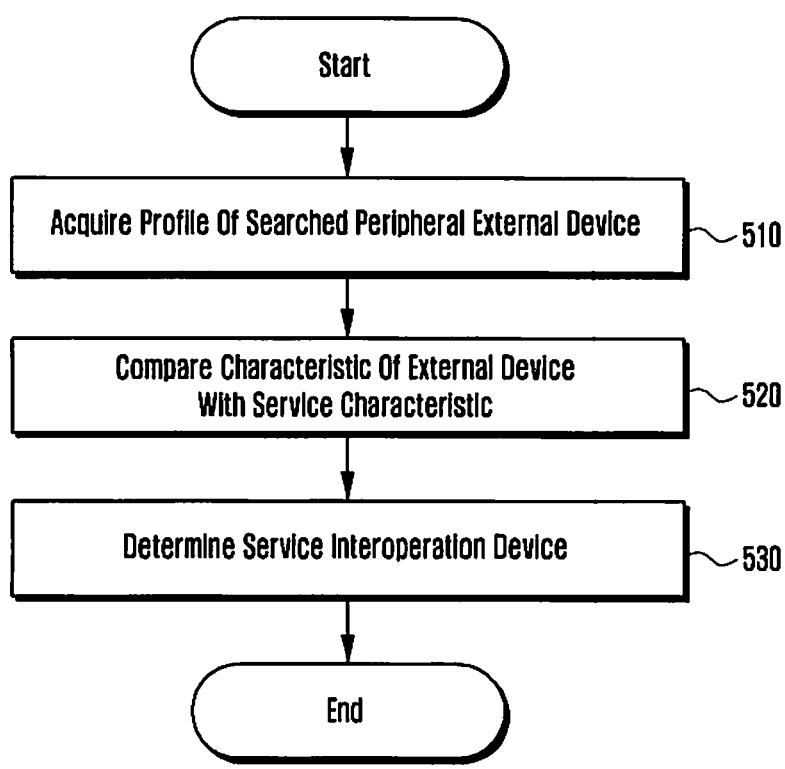
FIG. 5A is a flowchart illustrating a method of recommending a service interoperation device according to an embodiment of the present invention.

FIG. 5A is a flowchart illustrating a method of recommending a service interoperation device according to an embodiment of the present invention. Specifically, FIG. 5A illustrates step 440 of FIG. 4 in more detail.

Referring to FIG. 5A, a portable terminal acquires a profile of a searched peripheral external device in step 510. The profile includes information with respect to characteristics of the searched peripheral external device. For example, the portable terminal may request the profile from the searched external device or a profile server that stores profiles of the external devices.

According to another embodiment of the present invention, the portable terminal may transmit characteristics of the service to be performed to the searched external devices (or a profile server) and then receive the profile of an external device, which is determined to be suitable to the characteristics of the service by the searched external devices (or the profile server). In the embodiment, the portable terminal may automatically recommend the external device that transmitted the profile to the portable terminal as the service interoperation device. A procedure of determining suitability for performing a service by the external device is the same as a procedure of determining a service interoperation device to be recommended by the portable terminal below.

In step 520, after acquiring the profile, the portable terminal compares a characteristic of an external device with a service characteristic.

Examples of the service characteristic and the characteristic of the external device are shown in Tables 1 and 2 below. Table 1 divides the service characteristic into a service type, an output scheme, and a control input scheme, and it further includes an example for each item. Table 2 classifies the characteristic of the external device into a device type, a function, and performance, and it also describes an example for each item. Using Tables 1 and 2, the portable terminal analyzes the profile to indentify the characteristic of the external device.

TABLE 1

| Service type | Output scheme | Control input scheme |
| --- | --- | --- |
| Movie | Sound | Direction |
| Photo | Display | Text |
| Music | | Movement |
| SNS | | Function |
| Game | | Combination |
| Web Browser | | |
| Message | | |
| Document Editor (Word) | | |
| Video Streaming Player | | |
| Map | | |
| Calendar | | |

TABLE 2

| Device type | | Function | Performance |
| --- | --- | --- | --- |
| Output device | Display | Resolution | xxxx px by xxxx px |
| | | Screen size | xxx inch |
| | | 3D support | Y or N |
| | | Remote controller | Y or N |
| | Sound | Output power | xx Watts |
| | | Controller | Y or N |
| Control input device | | Controller | N/A |
| | | Keyboard | |
| | | Mouse | |
| | | Joystick | |
| | | Touch pad | |

The portable terminal may indentify the service characteristic and the characteristic of the external device using Tables 1 and 2. The portable terminal compares the characteristic of the external device with the service interoperation device preference predetermined in accordance with the characteristics of the service. Because the service interoperation device preference may be previously set, various preferences of a user can be satisfied and the user can be provided with a high quality service.

Table 3 illustrates an example of a service interoperation device preference.

TABLE 3

| Service type | Control | | Output device | | | Input device Function |
|---|---|---|---|---|---|---|
| | Output scheme | input scheme | Device type | Function | Performance | |
| Movie, Video Streaming Player | Display | Function | Display | Screen size | Large | Dedicated controller |
| Sketch, Map | Display | Combination | Display | Resolution | High resolution | Touch pad |
| 3D Movie | Display | Function | Display | 3D support | Possible | Dedicated controller |
| Web Browser, SNS, Message, Document Editor, Calendar | Display | Text | Display | Screen size | Middle | Key board |
| Game | Display | Movement | Display | Screen size | Middle | Mouse, joystick, touch pad |
| Photo | Display | Direction | Display | Screen size | Middle | Dedicated controller |
| Music | Sound | Function | Sound | Output power | >5 Watt | Dedicated controller |

For example, when the service type is a Movie service, the portable terminal indentifies that the service type is the Movie service, that the output scheme is Display, and that the control input scheme is Function in the service characteristic with reference to Table 1. Thereafter, the portable terminal indentifies a characteristic of the external device from the acquired profile.

For example, the portable terminal indentifies a device type, functions, and performance of external devices with reference to the table 2. Thereafter, the portable terminal confirms a service interoperation device preference of Movie with reference to the Table 3.

Accordingly, the portable terminal may compare the characteristic of the external device with the characteristic of the Movie service, based on the service interoperation device preference. Further, when performing the comparison, the portable terminal may indentify that a display output device having a large screen and a controller of an output device are preferred as the service interoperation devices.

Referring again to FIG. 5A, in step 530, the portable terminal determines the service interoperation device. Further, the portable terminal may determine one or more external devices as the service interoperation devices.

For example, when a speaker, a tablet PC, and a television transmit a profile to the portable terminal, the portable terminal may determine and recommend a television having a large screen as a display output device for the Movie service.

In accordance with an embodiment of the present invention, a priority may be determined with reference to the service interoperation device preference in order to recommend a service interoperation device. For example, when the service interoperation device preference is a large display output device, the portable terminal recommends external display output devices having an output unit larger than a predetermined size as the service interoperation devices. Thereafter, the portable terminal may determine a priority according to screen sizes of the determined service interoperation devices. Accordingly, when multiple service interoperation devices are recommended, the portable terminal allows the user to easily select an external device to be interoperated.

Figure 5B:
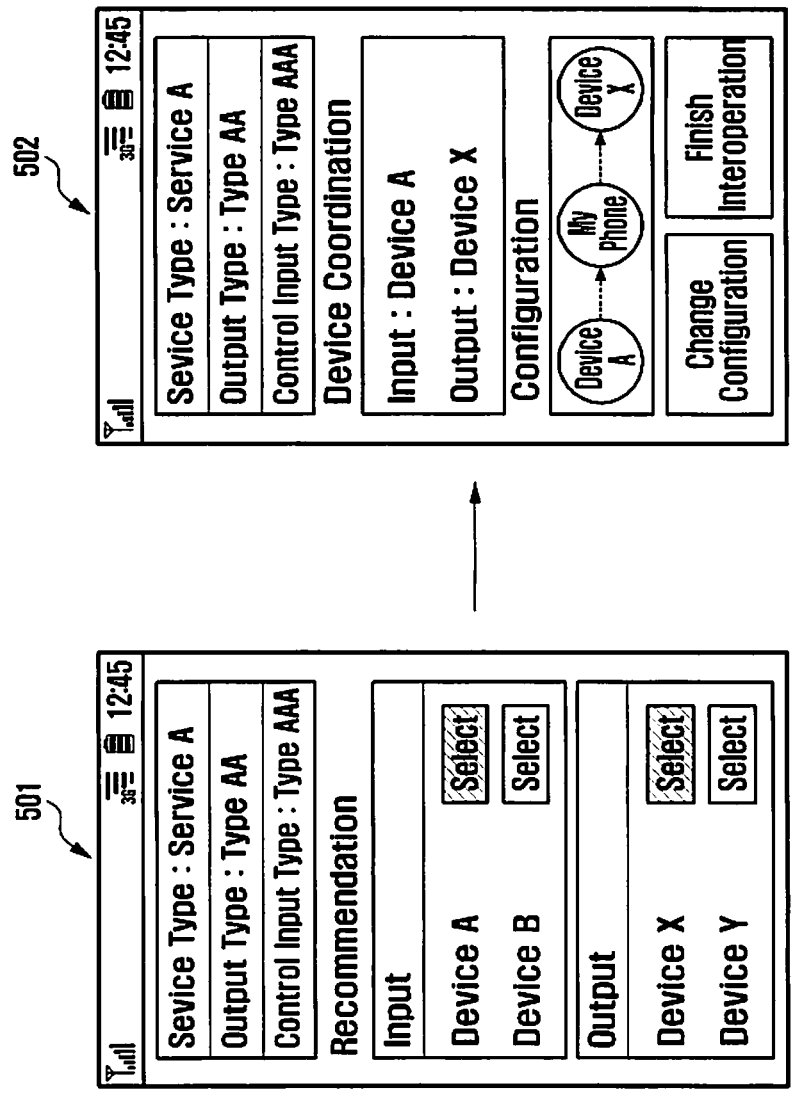
FIG. 5B illustrates examples of screen displays that are output when a service interoperation is performed according to an embodiment of the present invention.

FIG. 5B illustrates examples of screen displays that are output when a service interoperation is performed according to an embodiment of the present invention.

Referring to FIG. 5B, screen 501 is an example of a screen that is displayed to recommend a service interoperation device, e.g., in step 440 of FIG. 4. Screen 501 lists a service characteristic such as a service type, an output type, and a control input scheme, classifies external devices into a service type, a control input device and an output device and recommends several devices according to a device type, and may allow the user to select a desired device from the list of the recommended service interoperation devices.

Screen 502 of FIG. 5B is an example of a screen that output when a service interoperation device to be interoperated with the portable terminal is selected, e.g., in step 450 of FIG. 4. Screen 502 displays the service interoperation devices selected to perform the service and functions of the respective devices as a simple drawing when performing the service.

For example, the service interoperation device may operate as a control input device and an output device, and the portable terminal may serve as a mediator between the service interoperation devices.

Accordingly, screen 502 includes a picture that Device A transmits data to the portable terminal (My Phone) and My Phone transmits data to a Device X.

In addition, screen 502 provides a Change Configuration button, which returns to screen 501 so that the user can reselect the service interoperation device. Further, screen 502 provides a Finish Interoperation button so that the portable terminal directly terminates a service interoperation procedure, e.g., step 470 of FIG. 4.

Figure 6A:
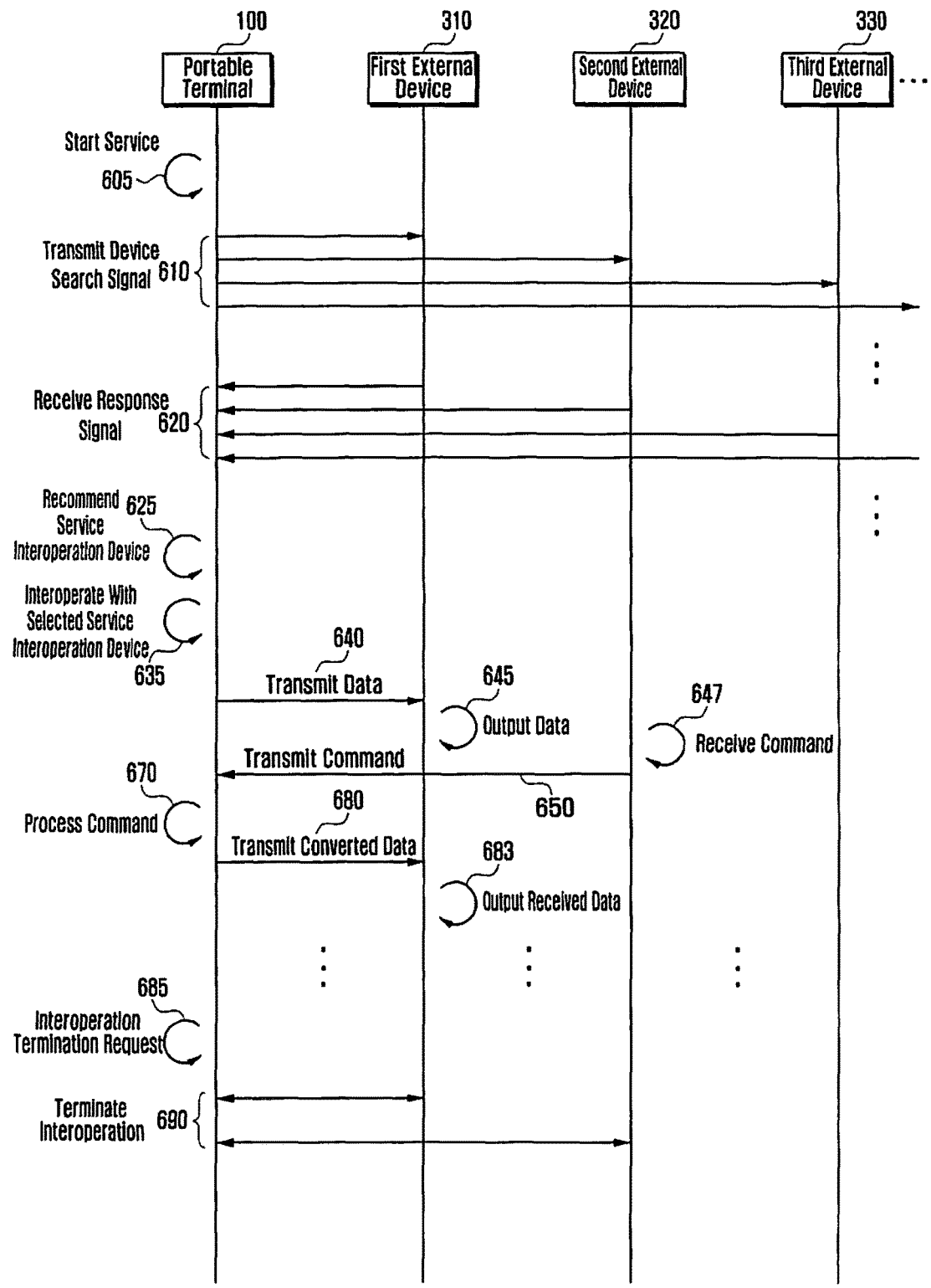
FIG. 6A is a signal flow diagram illustrating a procedure of a portable terminal performing a service in interoperation with external devices according to an embodiment of the present invention.

FIG. 6A is a signal flow diagram illustrating a procedure of a portable terminal performing a service in interoperation with peripheral external devices according to an embodiment of the present invention.

Referring to FIG. 6A, a portable terminal 100 starts a service in step 605. In step 610, the portable terminal 100 transmits a device search signal to peripheral external devices 310, 320, and 330. In response to this action, the external devices 310, 320, and 330 transmit a response signal to the portable terminal 100 in step 620.

In step 625, the portable terminal 100 recommends, for example, a first external device 310 and a second external device 320 among the external devices 310, 320, and 330, as service interoperation devices.

In step 635, the portable terminal 100 interoperates with a device selected from the recommended service interoperation devices. The portable terminal 100 may determine each function of the first external device 310, the second external device 320, and the portable terminal 100. For instance, when performing the service, the functions may include a control input device, an output device, and a mediator.

When determining the functions, the portable terminal 100 may refer to a profile acquired when recommending the service interoperation device in step 625. The portable terminal 100 may indentify a type of the service interoperation device recommended from the profile. According to another embodiment of the present invention, the portable terminal 100 may store a characteristic of a previously interoperated service interoperation device. Accordingly, the portable terminal 100 may determine a function of the recommended service interoperation device without receiving a separate profile.

After identifying the device type, the portable terminal 100 classifies the recommended service interoperation device into an input device and an output device and determines functions thereof. If a plurality of service interoperation devices is recommended in a specific device type, the portable terminal 100 may select one service interoperation device according to a priority or a user input.

If there is one output device and one control input device in the recommended service interoperation devices, the portable terminal 100 serves as a mediator between the output device and the control input device.

When the recommended service interoperation device includes one output device, the portable terminal 100 serves as a control input device, and when the recommended service interoperation device includes one input device, the portable terminal 100 serves as an output device.

After the functions are determined as described above, the first external device 310, the second external device 320, and the portable terminal 100 transmit and receive the service data and commands for processing the service data to each other according to the determined functions, as illustrated in steps from 640 to 683.

If the function of the portable terminal 100 is a mediator, the portable terminal 100 receives a command from a service interoperation device having a function of the input device. The portable terminal 100 processes the service data according to the received command and transmits the processed service data to a service interoperation device having a function of an output device.

For example, the portable terminal 100, the first external device 310, and the second external device 320 serve as a mediator, an output device, and an input device, respectively.

Accordingly, the portable terminal 100 transmits data to be outputted to the first external device 310 in step 640. The transmitted data may be data for display or data for sound output. In step 645, the first external device 310 outputs the data. If the second external device 320 receives the command as illustrated in step 647, the second external device 320 transmits the command to the portable terminal 100 in step 650.

According to another embodiment of the present invention, the second external device 320 may transmit the command to the portable terminal 100 via the first external device 310.

In step 670, the portable terminal 100 converts the command received from the second external device 320 into an interpretable command for the portable terminal 100. The portable terminal 100 processes the converted command according to the service. The portable terminal 100 converts service data generated when processing the command into data compatible with the first external device 310. In step 680, the portable terminal 100 transmits the converted data to the second external device 320. The first external device 310 outputs the received data in step 683.

The portable terminal 100, the first external device 310, and the second external device 320 repeat steps from 640 to 683, while performing the service in interoperation with one another.

In step 685, the portable terminal 100 receives an interoperation termination request, while interoperably performing the service. Accordingly, the portable terminal 100 terminates the interoperation with the first external device 310 and the second external device 320 in step 690.

When the function of the portable terminal 100 is determined as the input device, the portable terminal 100 receives and processes a user input. The portable terminal 100 transmits service data to a service interoperation device having a function of the output device.

When the function of the portable terminal 100 is determined as the output device, the portable terminal 100 receives a command from the service interoperation device having the function of the input device. Thereafter, the portable terminal 100 processes and outputs the service data according to the command.

The portable terminal 100 may generate and transmit at least one of an input Graphic User Interface (GUI) and an output GUI to a service interoperation device having a corresponding function according to a function of the service interoperation device.

Figure 6B:
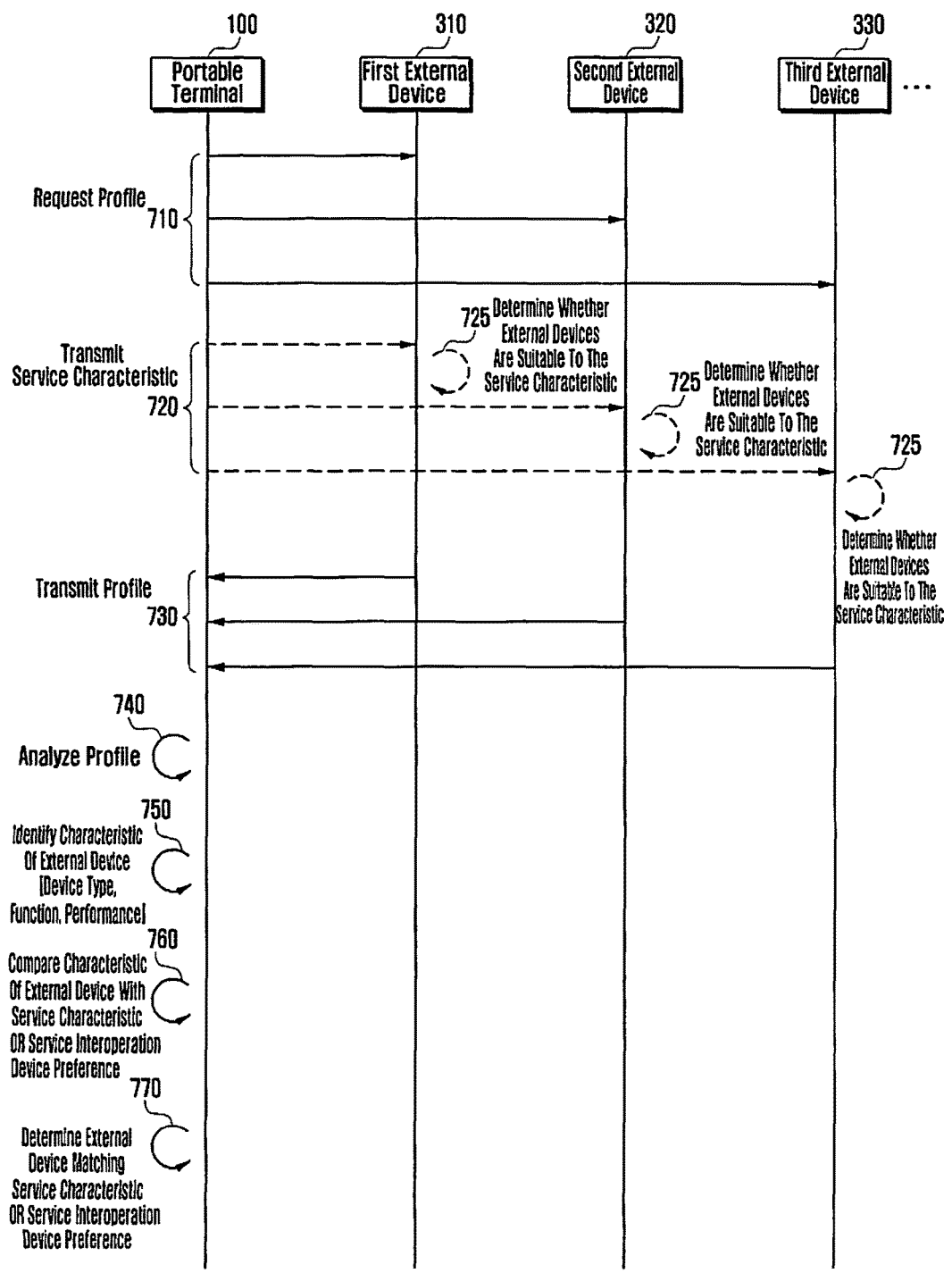
FIG. 6B is a signal flow diagram illustrating a procedure of determining and recommending a service interoperation device among external devices according to an embodiment of the present invention.

FIG. 6B is a signal flow diagram illustrating a procedure of determining and recommending a service interoperation device among external devices according to an embodiment of the present invention. Specifically, FIG. 6B illustrates Step 625 of FIG. 6A of recommending the service interoperation device in more detail.

Referring to FIG. 6B, in step 710, the portable terminal 100 requests a profile from each of the external devices 310, 320, and 330. The portable terminal 100 performs step 710 while recognizing that peripheral external devices 310, 320, and 330 exist.

In step 730, the external devices 310, 320, and 330 transmit the profile to the portable terminal 100. When the external devices 310, 320, and 330 do not have the profile, the external devices 310, 320, and 330 may request a profile server (not shown) to transmit the profile to the portable terminal 100.

According to another embodiment of the present invention, the portable terminal 100 may perform step 720 instead of step 710. That is, the portable terminal 100 may transmit a service characteristic to the external devices 310, 320, and 330 in step 720. The external devices 310, 320, and 330 may then determine themselves whether the external devices 310, 320, and 330 are suitable to the received service characteristics in step 725. In this case, the external devices 310, 320, and 330 may compare device types, functions, characteristics, service types, output schemes, and control input schemes one another to determine suitability. The external devices 310, 320, and 330 then may selectively transmit the profile to the portable terminal 100 in step 730.

More particularly, when it is determined that the external devices 310, 320, and 330 are suitable to the service characteristics, the external devices 310, 320, and 330 may transmit the profile to the portable terminal 100.

Once the portable terminal 100 receives the profiles transmitted from the external devices 310, 320, and 330, the portable terminal 100 analyzes the profile in step 740. After the portable terminal 100 identifies characteristics of the external devices in step 750, the portable terminal 100 performs compares the identified characteristics of the external devices with the service characteristics or a service interoperation device preference in step 760. The portable terminal 100 determines external devices matching the service characteristics or the service interoperation device preference in step 770.

Although FIG. 6B illustrates that the portable terminal 100 requests the profile from the external devices 310, 320, and 330, the portable terminal 100 may request profiles of the external devices 310, 320, and 330 from a profile server.

Figure 7:
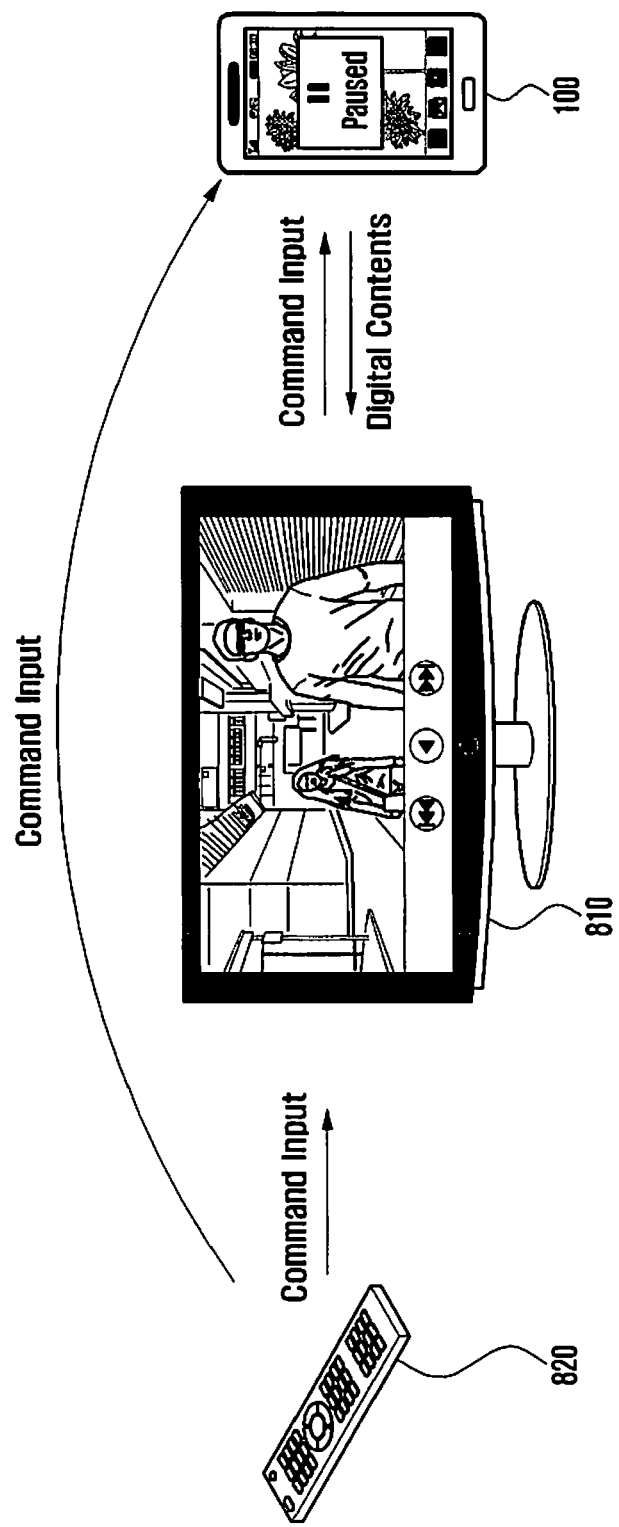
FIG. 7 illustrates a system for interoperably performing a service according to an embodiment of the present invention.

FIG. 7 is a conceptual diagram illustrating a system for interoperably performing a service according to an embodiment of the present invention. Specifically, FIG. 7 illustrates a portable terminal 100 performing a service in interoperation with a Television (TV) 810 and a TV remote controller 820.

Referring to FIG. 7, the TV and the TV remote controller correspond to the first external device 310 and the second external device 320, respectively, as illustrated in FIGS. 6A and 6B. For example, when a Movie service is performed, the portable terminal 100 receives a command from the TV remote controller 820. The command may be transferred to the portable terminal 100 through the TV 810 or be directly transmitted to the portable terminal 100. The command may include 'pause', 'playback', and 'rewind' associated with the Movie service.

As illustrated in FIG. 7, the portable terminal 100 may display that the command 'paused' is received. The portable terminal 100 processes the command and transmits data to the TV 810 according to the command. Accordingly, the portable terminal 100 may display the paused movie screen and a changed function menu according to the command.

According to another embodiment of the present invention, the portable terminal 100 may support a service processed based on a cloud server. For example, when an application for performing the service is installed in the cloud server, the portable terminal 100 may transmit a command for the service to the cloud server. The portable terminal 100 may receive the processed service data from the cloud server according to the command.

For example, for a game service processed by the cloud server, i.e., the game application installed in the cloud server, the portable terminal 100 may transmit a game control input to the cloud server. In this case, the portable terminal 100 may transfer the command received from the service interoperation device to the cloud server according to a function of the portable terminal 100. The portable terminal 100 may convert the received command for the cloud server and transmit the converted command to the cloud server. In response, the cloud server may process a game control input by itself and transmit output data of a game service, for example, a game screen to the portable terminal 100. The portable terminal 100 may output the output data of the game service.

The portable terminal 100 may transfer output data of the game service to the service interoperation device according to the function of the portable terminal 100.

Figure 8:
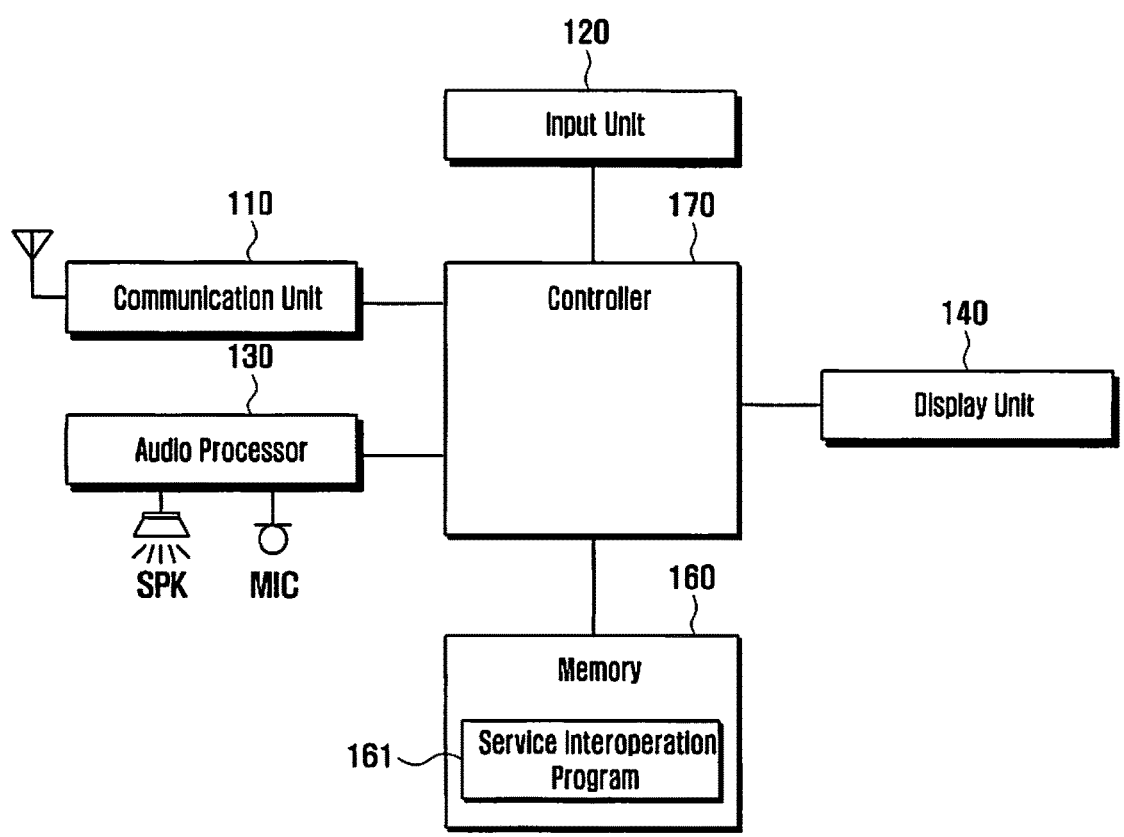
FIG. 8 is a block diagram illustrating a portable terminal according to an embodiment of the present invention.

FIG. 8 is a block diagram illustrating an internal configuration of a portable terminal according to an embodiment of the present invention.

Referring to FIG. 8, the portable terminal includes a communication unit 110, an input unit 120, an audio processor 130, a display unit 140, a memory 160, and a controller 170. Herein, the term "unit" refers to a hardware device or a combination of a hardware device and software.

The communication unit 110 forms a communication channel for voice call, a communication channel for image call, and a communication channel for transmitting data (referred to as a "data communication channel") such as images or sounds under control of the controller 170.

The communication unit 110 forms a communication channel with peripheral external devices under the control of the controller 170 in a service interoperation performing mode. Through the formed communication channel, the communication unit 110 transmits a search signal for searching for a device for a service interoperation and for receiving a response to the search signal. The communication unit 110 may receive the profile from the external device or the profile server.

According to another embodiment of the present invention, the communication unit 110 may transmit a characteristic of a service to be performed through the communication channel formed with the external device. The communication unit 110 receives the command from a service interoperation device set as an input device through a communication channel with the service interoperation device determined to interoperably perform the service, and transmits service data processed according to the command to the service interoperation device set as an output device.

The communication unit 110 may also form a communication channel with the cloud server. Accordingly, the portable terminal 100 may provide the service based on the cloud server.

The input unit 120 receives various text information, and transfers signals input associated with setting of various functions and function control of the portable terminal 100 to the controller 170. For example, the input unit 120 may be a touch pad, a key pad of a general key arrangement, and a key pad of a QWERTY type, or a combination thereof. The input unit 120 may further include function keys, such as arrow keys, volume keys, and hot keys set to perform a specific function.

In particular, the input unit 120 generates and transfers a start request signal for entering a service interoperation mode and a termination request signal for requesting termination of the service interoperation mode to the controller 170. The input unit 120 receives a selection of a specific device among recommended service interoperation devices, generates a signal for requesting interoperation with the specific device, and transfers the generated signal to the controller 170. The input unit 120 generates a signal for requesting change of a device to be interoperated and transfers the signal to the controller 170.

In response to a change request signal, the controller 170 may again recommend service interoperation devices to the user.

The audio processor 130 includes a speaker SPK for playing audio data and a microphone MIC for collecting audio signals.

Particularly, the audio processor 130 may operate recommended service interoperation devices or output a sound effect informing of an interoperation state or a termination. The audio processor 130 may output guide information with respect to performing a corresponding service, for example, service name or a name of a default function as a voice signal during execution of the service interoperation program. The audio processor 130 may collect a voice signal of the user and voice-recognizes the voice signal collected by the controller 170 so that the user selects the service interoperation device.

The display unit 140 displays information input by the user or information provided to the user, as various screens according to use of the portable terminal.

Particularly, the display unit 140 displays the searched external devices, e.g., outputs screens as illustrated in FIG. 5B, in the service interoperation mode under control of the controller 170. Accordingly, the display unit 140 may display a service characteristic, a recommended service interoperation device, and a device function.

For example, the display unit 140 may be a Liquid Crystal Display (LCD) or an Organic Light Emitted Diode (OLED).

The memory 160 stores at least one application for function operation, user data generated by the user, messages transceived through a communication channel, data produced by execution of an application, etc.

For example, the memory 160 may include a program area and a data area. The program area stores an Operating System (OS) for operating the portable terminal and constituent elements, a camera application for generating digital images and video, a movie playback application, a music playback application, a web browser application, a multimedia game application, a calendar application, an e-mail application, a text message application, etc. Notably, the program area also stores a service interoperation program 161.

The service interoperation program 161 recommends a service interoperation device suitable to the service characteristic to perform the service in interoperation with the external device, and performs functions of the service interoperation device and the portable terminal. Accordingly, the service interoperation program 161 includes an external device search routine, a service interoperation device recommendation routine, and a service performing routine of the service interoperation device. The recommendation routine acquires a profile from the external device and recommends an external device suitable to the service characteristic as the service interoperation device. The service performing routine transceives data for performing the service according to functions of the service interoperation device and the portable terminal.

The data area stores data generated through the use of the portable terminal.

In particular, the data area stores a service characteristic, a profile, and a service interoperation device preference reference. Accordingly, the controller 170 utilizes the data area to recommend a service interoperation device suitable to the service characteristic.

The data area may also store command compatible information for converting a command received from the service into a command, which the portable terminal may interpret.

Further, the data area may store service data compatible information for converting data of a service to be transmitted to the service interoperation device into data supported from a corresponding service interoperation device.

For example, the controller 170 converts a control command received from a TV remote controller into a command of a movie playback application supported from the portable terminal, and converts the converted command into data suitable to a standard of a TV, and transmits movie data.

The controller 170 controls an overall operation of the portable terminal.

Particularly, the controller 170 recommends a service interoperation device to perform the service together with the portable terminal among peripheral external devices, and provides the service in interoperation with the recommended service interoperation device. When performing the service, the controller 170 designates functions of the service interoperation device and the portable terminal, and service command and data according to the designated functions. Accordingly, the controller 170 recommends and interoperates the most suitable external device so that the user may conveniently enjoy a high quality service.

Figure 9:
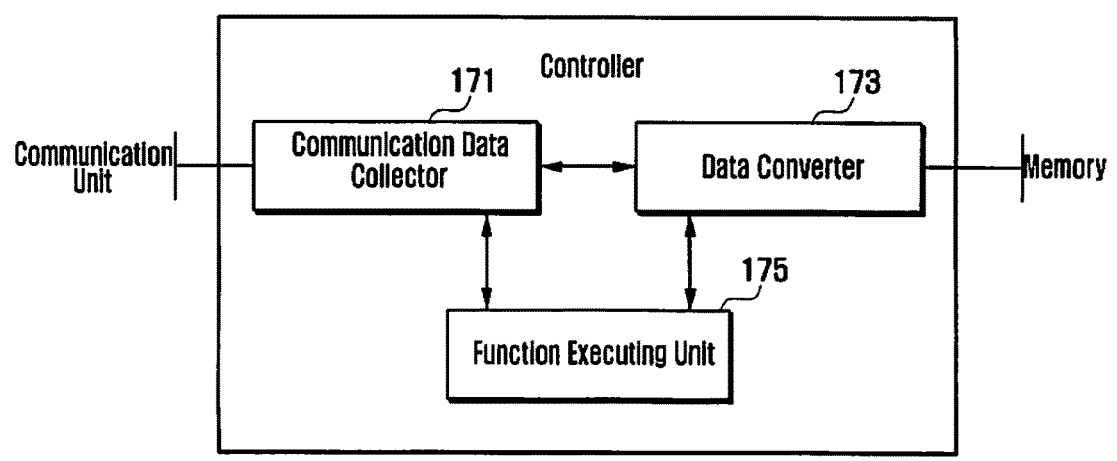
FIG. 9 is a block diagram illustrating a controller of a portable terminal according to an embodiment of the present invention.

FIG. 9 is a block diagram illustrating a controller according to an embodiment of the present invention.

Referring to FIG. 9, the controller includes a communication data collector 171, a data converter 173, and a function executing unit 175. Although FIG. 9 illustrates various components of the controller for ease of description, the controller does not necessarily include these various components, but performs the operations of these components itself.

The communication data collector 171 collects data received from the communication unit 110. Particularly, the communication data collector 171 transfers data received from the communication unit 110 to the function executing unit 175 or the data converter 173. If a search response signal is received from a profile or a peripheral external device, the communication data collector 171 transfers the received data to the function executing unit 175. If receiving the command, the communication data collector 171 transfers the command to the data converter 173.

The data converter 173 converts various data according a specific scheme. Particularly, the data converter 173 converts the command received from the data collector 171 into a command that the function performing unit 175 may process with reference to command compatible information. The data converter 173 transfers the converted command to the function executing unit 175.

In response to a request of the function executing unit 175, the data converter 173 converts service data into data supported from a service interoperation device performing a function of an output device. In this case, the data converter 173 may refer to service data compatible information. The data converter 173 may transfer the converted data to the function executing unit 175.

The function executing unit 175 executes various functions provided from the portable terminal 100. Particularly, the function executing unit 175 executes a procedure of interoperably performing a service according to data from the communication data collector 171. For example, when receiving a search response signal, the function executing unit 175 indentifies an external device located in a periphery from the search response signal. When receiving a profiler, the function executing unit 175 analyzes the profile to recommend a service interoperation device suitable to the service characteristic.

The function executing unit 175 executes a procedure of interoperably performing the service according to data provided from the data converter 173. For example, when receiving the converted command, the function executing unit 175 processes a command according to a corresponding application. The function executing unit 175 generates data according to processing the command, requests data conversion from the data converter 173 such that the generated data are converted into a format supported from a service interoperation device performing a function of an output device, and then transmits the converted data to a corresponding service interoperation device. In this case, the function executing unit 175 may transmit data converted by the communication data collector 171. Alternatively, the converted data may be directly transmitted to the data converter 173.

As described above, a method and apparatus for interoperably performing a service, and a system supporting the same, are provided to recommend suitable devices to perform the service according to a service characteristic of a portable terminal. Accordingly, a user may conveniently select a device suitable to the service from recommended devices, even if the user does not know which device is available in a periphery of the portable terminal in a strange environment.

Accordingly, in accordance with an embodiment of the present invention, a portable terminal conveniently interoperates with another device and allows a user to easily enjoy the service.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. A method for performing a service in a portable terminal with a service interoperation device, the method comprising:
   searching, by the portable terminal, external devices;
   identifying the service interoperation device corresponding to a characteristic of the service among the searched external devices;
   attempting to acquire a profile of each searched external device from the searched external devices, wherein attempting to acquire the profile of each searched external device comprises transmitting the service characteristic to the searched external devices, and attempting to receive each profile from each external device that is suitable to the service characteristic among the searched external devices;
   if the profile cannot be acquired from the searched external devices, acquiring the profile from a profile server storing profiles; and
   recommending the service interoperation device, wherein, if multiple service interoperation devices are identified, prioritizing the multiple service interoperation devices based on the characteristic of the service and recommending the service interoperation device based on the prioritized multiple service interoperation devices;
   classifying the recommended service interoperation device into a list of an input device, an output device, and a control input device, wherein the input device, the output device, and the control input device are separate selectable devices;
   determining a function of the portable terminal based on the classified service interoperation device; and
   performing the service in interoperation with the recommended service interoperation device,
   wherein the characteristic of the service includes a type of service, an output scheme, and a control input scheme of the service.

2. The method of claim 1, wherein identifying the service interoperation device further comprises-determining an external device corresponding to the service characteristic as the service interoperation device, based on the acquired profile.

3. The method of claim 2, wherein determining the external device as the service interoperation device comprises:
   identifying a characteristic of an external device from the profile;
   comparing the characteristic of the external device with the service characteristic; and
   determining the external device as the service interoperation device, when the characteristic of the external device matches the service characteristic.

4. The method of claim 1, wherein identifying the service interoperation device comprises determining the external device that transmitted the profile to the portable terminal as the service interoperation device.

5. The method of claim 4, wherein determining the external device as the service interoperation device comprises:
   identifying a characteristic of a corresponding external device from the profile;
   comparing the characteristic of the external device with the service characteristic; and
   determining the external device as the service interoperation device, when the characteristic of the external device matches the service characteristic.

6. The method of claim 5, wherein the characteristic of the external device includes a device type, a providing function, and performance according to the providing function, and
   wherein the device type includes at least one of a control input device and an output device.

7. The method of claim 5, wherein the service characteristic includes a service interoperation device preference previously set for each characteristic of the service.

8. The method of claim 1, wherein performing the service comprises:
   determining functions of the service interoperation device and the portable terminal; and
   transceiving data of the service and commands for processing the data of the service between the service interoperation device and the portable terminal, according to the determined functions.

9. The method of claim 8, wherein transceiving the data of the service comprises:
   when a function of the portable terminal is a mediator, receiving a command from the service interoperation device having a function of an input device, and processing the data of the service according to the received command, and transmitting the processed data of the service to the service interoperation device having a function of an output device;
   when the function of the portable terminal is the input device, transmitting the data of the service to the service interoperation device having a function of the output device; and
   when the function of the portable terminal is the output device, receiving a command by the service interoperation device having a function of the input device, and processing and outputting the data of the service according to the command by the portable terminal.

10. The method of claim 8, wherein performing the service comprises generating and transmitting at least one of an input Graphic User Interface (GUI) and an output GUI to the service interoperation device having a corresponding function by the portable terminal.

11. The method of claim 8, wherein transceiving the data of the service comprises:
converting a command received by the service interoperation device into an interpretable command of the portable terminal;
processing the interpretable command;
converting the data of the service into data compatible with the service interoperation device; and
transmitting the converted data.

12. The method of claim 1, wherein the service includes at least one of a service processed by the portable terminal and a service processed based on a cloud server.

13. The method of claim 12, wherein performing the service comprises:
transmitting a command for the service to the cloud server; and
receiving the data of the service processed according to the command from the cloud server.

14. The method of claim 1, wherein performing the service comprises:
automatically performing the service in interoperation with the service interoperation device, when only one service interoperation device is recommended; and
performing the service in interoperation with a service interoperation device selected by a user, when a plurality of service interoperation devices are recommended.

15. A method for performing a service in a portable terminal with a service interoperation device, the method comprising:
starting the service;
searching external devices including attempting to acquire a profile of each searched external device from the searched external devices, wherein attempting to acquire the profile of each searched external device comprises transmitting the service characteristic to the searched external devices, and attempting to receive each profile from each external device that is suitable to the service characteristic among the searched external devices, and if the profile cannot be acquired from the searched external devices, acquiring the profile from a profile server storing profiles;
recommending the searched external devices according to a characteristic of the service, wherein, if multiple searched external devices are identified, prioritizing the multiple searched external devices based on the characteristic of the service and recommending the searched external devices based on the prioritized multiple service interoperation devices;
classifying the recommended service interoperation device into a list of an input device, an output device, and a control input device, wherein the input device, the output device, and the control device are separate selectable devices;
selecting the service interoperation device from the recommended external devices;
determining a function of the portable terminal according to the selected service interoperation device; and
performing at least one of transmitting data of the service and receiving a command for processing the data of the service according to the determined function of the portable terminal,
wherein the characteristic of the service includes a type of service, an output scheme, and a control input scheme of the service.

16. The method of claim 15, wherein performing the at least one of transmitting and receiving comprises at least one of:
transmitting the data of the service to the selected service interoperation device, when the selected service interoperation device is an output device; and
receiving the command, when the selected service interoperation device is an input device.

17. An apparatus for performing a service with a service interoperation device, the apparatus comprising:
a communication unit for searching external devices by transmitting a profile request to each of the external devices; and
a controller for identifying a service interoperation device corresponding to a characteristic of the service among the searched external devices, attempting to acquire a profile of each the searched external device from the searched external devices, transmitting the service characteristic to the searched external devices, attempting to receive each profile from each external device that is suitable to the service characteristic among the searched external devices, if the profile cannot be acquired from the searched external devices, acquiring the profile from a profile server storing profiles recommending the service interoperation device, and if multiple service interoperation devices are identified, prioritizing the multiple service interoperation devices based on the characteristic of the service and recommending the service interoperation device based on the prioritized multiple service interoperation devices, classifying the recommended service interoperation device into a list of an input device, an output device, and a control input device, wherein the input device the output device, and the control input device are separate selectable devices, determining a function of the portable terminal based on the classified service interoperation device, and performing the service in interoperation with the recommended service interoperation device,
wherein the characteristic of the service includes a type of service, an output scheme, and a control input scheme of the service.

18. A system for performing a service, comprising:
a portable terminal; and
external devices communicating with the portable terminal,
wherein the portable terminal searches the external devices including attempting to acquire a profile of each searched external device from the searched external devices, wherein attempting to acquire the profile of each searched external device comprises transmitting the service characteristic to the searched external devices, and attempting to receive each profile from each external device that is suitable to the service characteristic among the searched external devices, and if the profile cannot be acquired from the searched external devices, acquiring the profile from a profile server storing profiles, recommends a service interoperation device corresponding to a service characteristic from the searched external devices, and if multiple searched external devices are identified, prioritizes the multiple searched external devices based on the characteristic of the service and recommends the service interoperation device based on the prioritized multiple service interoperation devices, classifies the recommended service interoperation device into a list of an input device, an output device, and a control input device, wherein the input device, the output device, and the control input device are separate selectable devices, determines a function of the portable terminal based on the classified service interoperation device, and performs the service in interoperation with the recommended service interoperation device, wherein the service characteristic includes a type of service, an output scheme, and a control input scheme of the service.

* * * * *